(12) United States Patent
Batarseh

(10) Patent No.: US 12,426,727 B2
(45) Date of Patent: Sep. 30, 2025

(54) SYSTEM FOR DISPLAYING WHEEL

(71) Applicant: Adel Batarseh, Anaheim Hills, CA (US)

(72) Inventor: Adel Batarseh, Anaheim Hills, CA (US)

(73) Assignee: Wheelimage Corp., Brea, CA (US)

( * ) Notice: Subject to any disclaimer, the term of this patent is extended or adjusted under 35 U.S.C. 154(b) by 0 days.

(21) Appl. No.: 18/597,890

(22) Filed: Mar. 6, 2024

(65) Prior Publication Data

US 2024/0315468 A1   Sep. 26, 2024

Related U.S. Application Data

(63) Continuation-in-part of application No. 17/896,548, filed on Aug. 26, 2022, now Pat. No. 12,042,068.

(51) Int. Cl.
*A47F 7/04* (2006.01)
*A47F 5/08* (2006.01)
*B60B 7/06* (2006.01)

(52) U.S. Cl.
CPC .............. *A47F 7/04* (2013.01); *A47F 5/0876* (2013.01); *A47F 5/0884* (2013.01); *B60B 7/063* (2013.01)

(58) Field of Classification Search
CPC ........ A47F 5/0876; A47F 5/08; A47F 5/0884; A47F 7/04; B60B 7/063; B62H 3/12; B62H 3/04; B60R 9/10; B65D 85/06; A47B 81/007
USPC ..... 24/582.1, 587.1, 593.1, 596.1, 329, 332, 24/335, 455, 485; 211/23, 89.01
See application file for complete search history.

(56) References Cited

U.S. PATENT DOCUMENTS

| | | | | |
|---|---|---|---|---|
| 1,515,690 A | * | 11/1924 | Marion | A47F 7/04 211/23 |
| 1,930,965 A | * | 10/1933 | Christy | A47F 5/08 211/94.01 |
| 1,971,152 A | * | 8/1934 | Barmache | A44C 1/00 24/329 |
| 2,056,878 A | * | 10/1936 | Wincholt | A47K 10/14 211/89.01 |
| 2,108,347 A | * | 2/1938 | Quarnstrom | F16L 3/13 211/89.01 |
| 2,455,236 A | * | 11/1948 | Darvie | A44C 7/004 24/522 |
| 2,532,021 A | * | 11/1950 | Gunderson | A47F 13/085 211/124 |
| 2,549,200 A | * | 4/1951 | Hooks | B43K 23/001 211/89.01 |
| 2,926,954 A | * | 3/1960 | Albert | B60B 7/10 301/5.21 |
| 3,548,422 A | * | 12/1970 | Byers | E03C 1/33 4/619 |
| 3,967,346 A | * | 7/1976 | Young, Jr. | A47F 5/0884 211/89.01 |

(Continued)

*Primary Examiner* — Devin K Barnett
(74) *Attorney, Agent, or Firm* — Dickinson Wright PLLC

(57) ABSTRACT

A system for displaying a wheel that includes a shelf unit that can be mounted on the wall. The shelf unit includes a shelf upon which an inner perimeter of the wheel may be supported. The outer end of the shelf unit is reinforced against a downward force by a diagonal member from the bottom end of the shelf unit to the outer end of the shelf. A retainer clip is inserted into the shelf unit and prevents the wheel from sliding off of the shelf.

3 Claims, 6 Drawing Sheets

(56) References Cited

U.S. PATENT DOCUMENTS

| | | | | |
|---|---|---|---|---|
| 4,194,635 | A * | 3/1980 | Ferrara | B42F 15/066 |
| | | | | 211/89.01 |
| 4,413,379 | A * | 11/1983 | Evans | A47K 10/12 |
| | | | | 24/3.11 |
| 4,794,675 | A * | 1/1989 | Bisconti | F16B 2/12 |
| | | | | 24/522 |
| 5,038,941 | A * | 8/1991 | Bastiaansen | A47F 7/06 |
| | | | | 211/32 |
| 5,097,785 | A * | 3/1992 | Zidek | E02B 3/26 |
| | | | | 211/23 |
| 5,695,161 | A * | 12/1997 | Brozak, Jr. | A47F 5/0884 |
| | | | | 223/94 |
| 6,481,583 | B1 * | 11/2002 | Black | A47F 5/0815 |
| | | | | 211/89.01 |
| D607,716 | S * | 1/2010 | Chiu | D8/395 |
| 7,861,901 | B2 * | 1/2011 | Kirschbaum | A47G 25/0657 |
| | | | | 211/89.01 |
| 8,322,669 | B2 * | 12/2012 | Brown | A47B 96/06 |
| | | | | 211/89.01 |
| 8,523,127 | B1 * | 9/2013 | Bennett | A63B 60/60 |
| | | | | 248/225.11 |
| 8,561,267 | B2 * | 10/2013 | Chang | A44B 11/12 |
| | | | | 211/89.01 |
| D769,107 | S * | 10/2016 | McLaren Hall | D8/373 |
| D961,363 | S * | 8/2022 | Richards | D8/367 |
| 2004/0099624 | A1 * | 5/2004 | Hein | A47L 13/512 |
| | | | | 211/89.01 |
| 2009/0145866 | A1 * | 6/2009 | Panosian | A47F 5/0838 |
| | | | | 211/85.15 |
| 2011/0260521 | A1 * | 10/2011 | Watkin | F16F 15/324 |
| | | | | 301/5.21 |
| 2011/0266862 | A1 * | 11/2011 | Halle | F16F 15/345 |
| | | | | 301/5.21 |
| 2015/0250333 | A1 * | 9/2015 | Schaefer | A47F 5/08 |
| | | | | 248/205.8 |

* cited by examiner

SYSTEM FOR DISPLAYING WHEEL

RELATED APPLICATIONS

The present application is a continuation-in-part of and claims priority to such extent as allowed by law to U.S. patent application Ser. No. 17/896,548 which is incorporated herein by reference.

TECHNICAL FIELD

The present disclosure relates to systems for displaying a wheel, and in particular, to systems including a shelf unit and a retainer clip.

BACKGROUND

Custom wheels are prime products in the realm of automotive accessories. As one might imagine, custom wheels come in a wide variety of styles to match different consumer preferences. Even though many custom wheels are sold online, there is simply no better way to select a custom wheel than by personal inspection. Up until now, a custom wheel showroom used a single piece hook, which was mounted on a wall or other surface, and which was used to hang a wheel and thus allow customers close and personal appreciation of each design and color of wheel available.

The single piece hook is inherently prone to failure. Because of its general design, wheels can easily slide off and fall to the ground. This could lead to a catastrophic failure of the wheel and loss of inventory. And yet, up until now, the single piece hook is used ubiquitously throughout the industry.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

One of the problems with the prior art single piece hook is that it includes a bottom portion and a top portion, each of which form a hook. In the case of the bottom hook, is angled upward and easily allows a wheel to slide downward and away from a wall upon which the hook is mounted upon. The top hook is used to restrain the wheel from moving away from the wall. However, the top hook is typically set at an angle such that the wheel easily slides away from the wall along the bottom hook. This simply makes no sense. Yet another issue with the single piece hook is that, in order to hang a wheel on such a hook, the wheel must be inserted into the top hook at a large angle relative to the wall. This means that any display of a plurality of wheels on a single wall must be spaced vertically so that such insertion angles into the top hook can be accommodated. Today, all of these issues are not only solved, but the reliability of holding a wheel in position is greatly improved. Accordingly, a wheel is much less prone to falling off of a hook as herein described.

Figure 1:
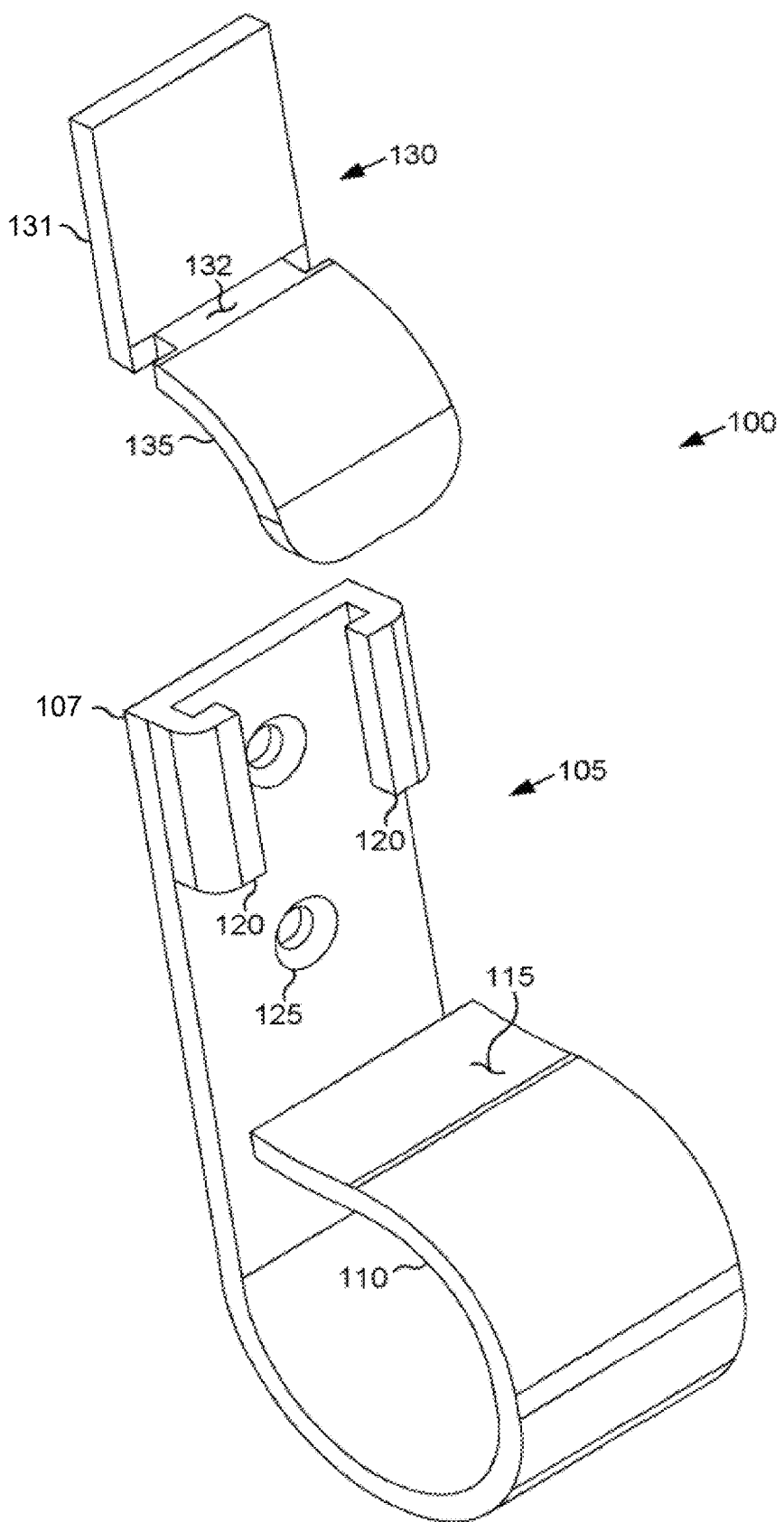
FIG. 1 is a pictorial diagram that illustrates one example embodiment of a system for displaying a wheel.

FIG. 1 is a pictorial diagram that illustrates one example embodiment of a system for displaying a wheel. In this example embodiment, a system 100 for displaying a wheel comprises a shelf unit 105 and a retainer clip 130. In this example embodiment, the shelf unit 105 includes a mounting flange 107, and a horizontal shelf 115 which is substantially orthogonal to the mounting flange 107. In some embodiments, the horizontal shelf 115 protrudes outward from the mounting flange 107. The shelf unit 105 of this example embodiment further includes a retainer receiver 120, which is disposed vertically along the mounting flange 107. The mounting flange 107 also includes one or more holes 125, which are used to receive fasteners to fasten the shelf unit 105 to a surface, for example a wall.

FIG. 1 also illustrates that, according to this example embodiment, the retainer clip 130 includes a retainer slide 131, which is sized to fit into the retainer receiver 120. In one alternative example embodiment, the retainer slide 131 is mechanically attached to a transition member 132 which then continues to a tongue 135. It should be appreciated that, according to another alternative embodiment, the tongue 135 is directly attached to the lower portion of the retainer slide 131.

FIG. 1. Also illustrates that, according to yet another alternative example embodiment, the horizontal shelf 115 is formed by curling the lower portion of the mounting flange 107 outward and upward to form a pliable region 110 for absorbing shock when a wheel is placed upon the horizontal shelf 115. Furthermore, this pliable region 110 allows the horizontal shelf 115 to bend downward, which effectively provides a cradling action for the wheel. This cradling action further reduces any tendency of a wheel from sliding forward along the horizontal shelf 115. Hence, the wheel is gently held against the mounting flange 107.

Figure 2:
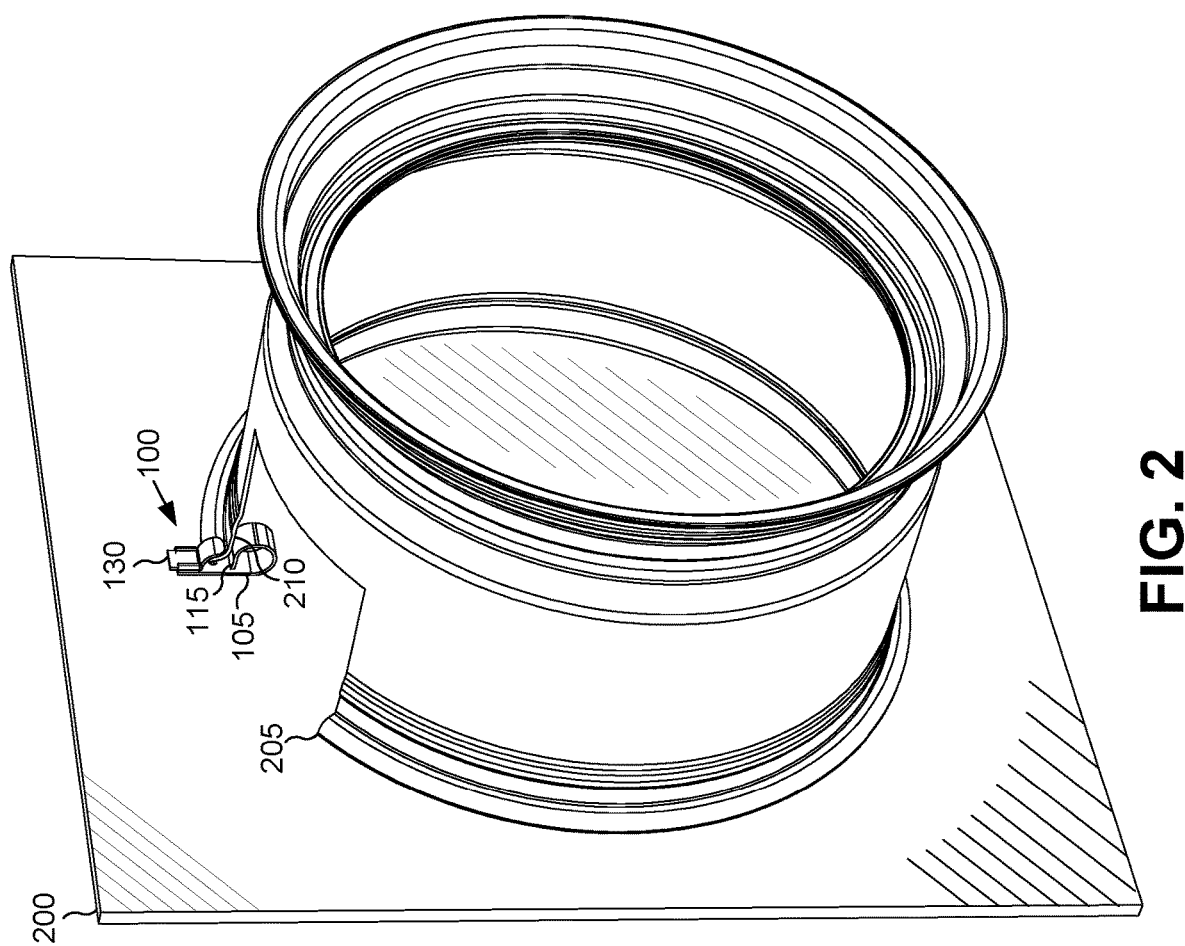
FIG. 2 is a pictorial diagram that illustrates application of one example embodiment of a system for displaying a wheel.

FIG. 2 is a pictorial diagram that illustrates application of one example embodiment of a system for displaying a wheel. According to one illustrative use case, the system 100 is utilized by first attaching the shelf unit 105 to a surface 200 (e.g. a wall). It should be appreciated that the shelf unit 105 is attached to the surface 200 by means of fasteners received through the holes 125 included in the flange portion of the shelf unit 105. After the shelf unit 105 is attached to the surface 200, a wheel 205 is placed on the horizontal shelf 115 such that an inner surface 210 of the wheel 205 rests upon the horizontal shelf 115. The inner surface 210 may be defined by an inner diameter or perimeter of the wheel 205. Because the retainer clip 130 is installed after the wheel 205 is placed on the horizontal shelf 115, the wheel 205 is placed directly onto the shelf 115 without being set at an angle. This means that the amount of vertical space between wheels on display can be minimized and the number of wheels displayed on a wall can be maximized. As already eluded to, once the wheel 205 is placed on the horizontal shelf 115, the retainer clip 130 is inserted into the retainer receiver and the tongue is then used to hold the wheel from sliding off of the horizontal shelf 115.

Figure 3:
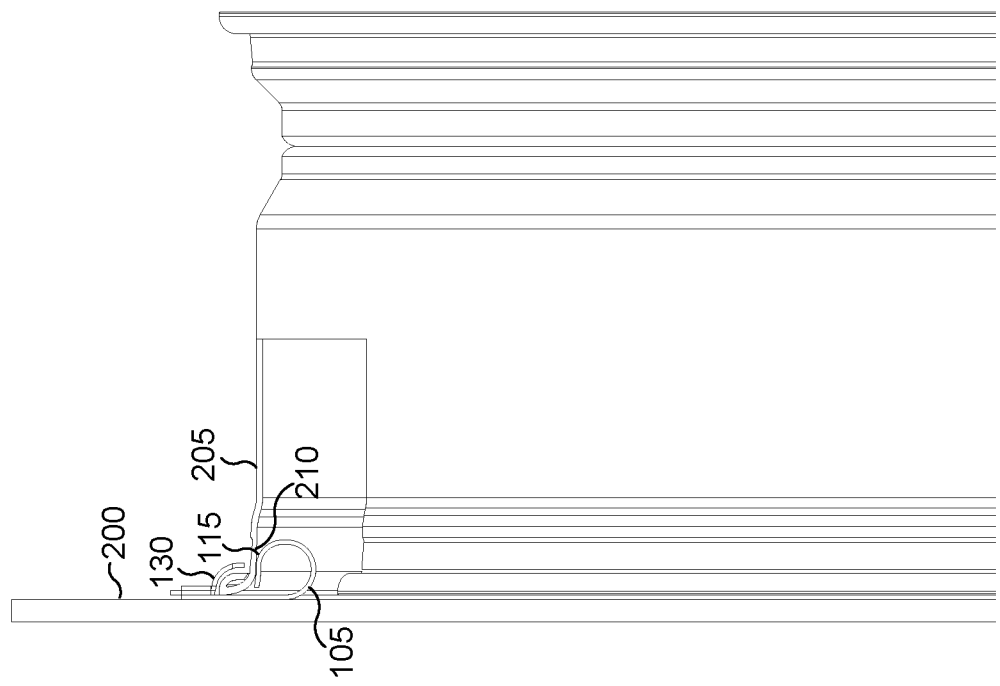
FIG. 3 is a cross-sectional view that depicts the interaction of the present system with a wheel.

FIG. 3 is a cross-sectional view that depicts the interaction of the present system 100 with a wheel 205. As can be appreciated, the shelf unit 105 is mounted on a surface 200. The shelf unit 105 includes a shelf 115 upon which the inner surface 210 of the wheel 205 is brought to rest. Once the wheel 205 has been placed on the shelf 115, the retainer clip 130 is used to preclude the wheel 205 from sliding away from the wall and off of the shelf 115 included in the shelf unit 105.

Figure 4:
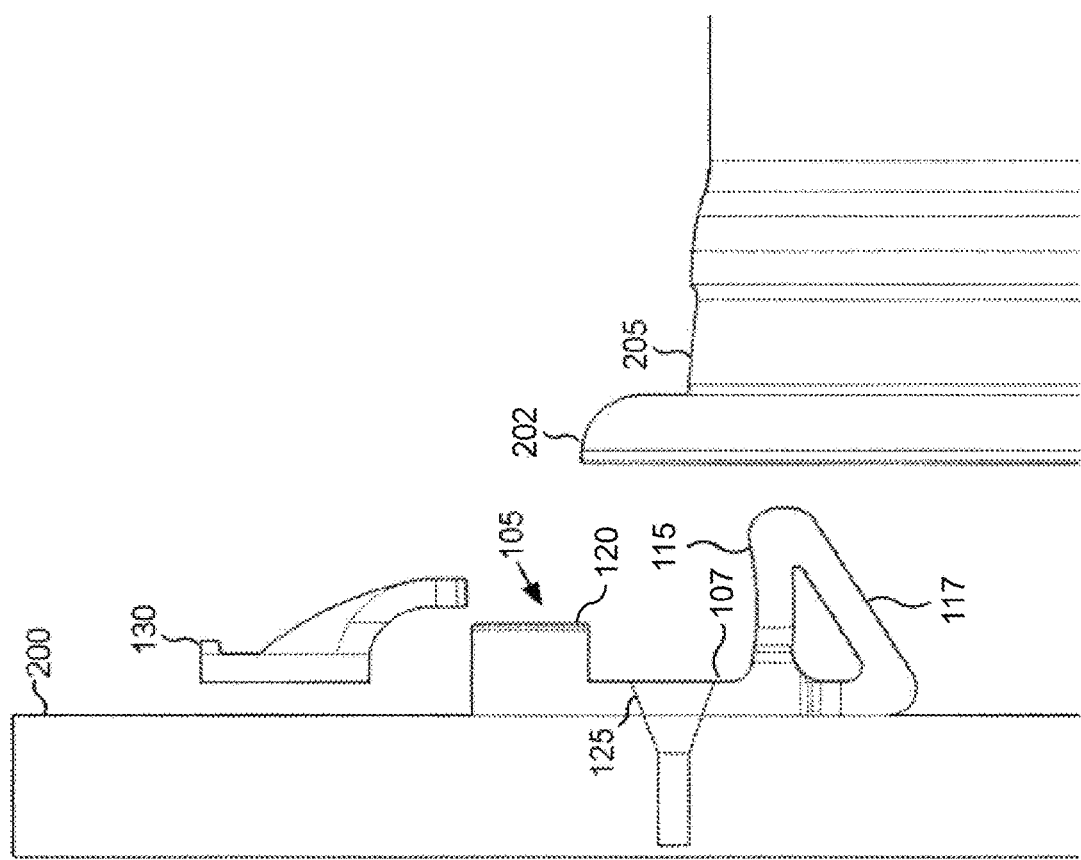
FIG. 4 is a pictorial diagram that illustrates a second embodiment of a system for displaying a wheel in a state where the wheel is not engaged.

FIG. 4 is a pictorial diagram that illustrates a second embodiment of the system 100 for displaying a wheel 205 in a state where the wheel 205 is not engaged. According to this alternative embodiment, the system 100 comprises a shelf unit 105. The shelf unit 105 further comprises a mounting flange 107. The mounting flange 107 includes one or more orifices 125 for mounting the flange onto a substantially vertical panel 200.

The shelf unit 105 further comprises a substantially horizontal shelf 115 (or a plurality of substantially horizontal shelves 115) that is mechanically attached to a lower portion of the mounting flange 107 and which for thrusts outward from the mounting flange 107. To ensure that the horizontal shelf 115 provides sufficient strength to support the weight of a wheel 205, it is reinforced with a diagonal support member 117. It should be appreciated that the diagonal support member 117 is attached to a lower end of the horizontal shelf 115 and then runs to an outer end of the horizontal shelf 115.

The shelf unit 105 also includes a retainer receiver 120 that is disposed vertically along the mounting flange 107 for receiving a retainer clip 130.

This alternative example embodiment of a system 100 for displaying a wheel 205 comprises an additional element called a retainer clip 130. The retainer clip 130, slides into the retainer receiver 120 in order to hold fast a wheel 205 that is supported by the system 100 herein described.

Figure 5:
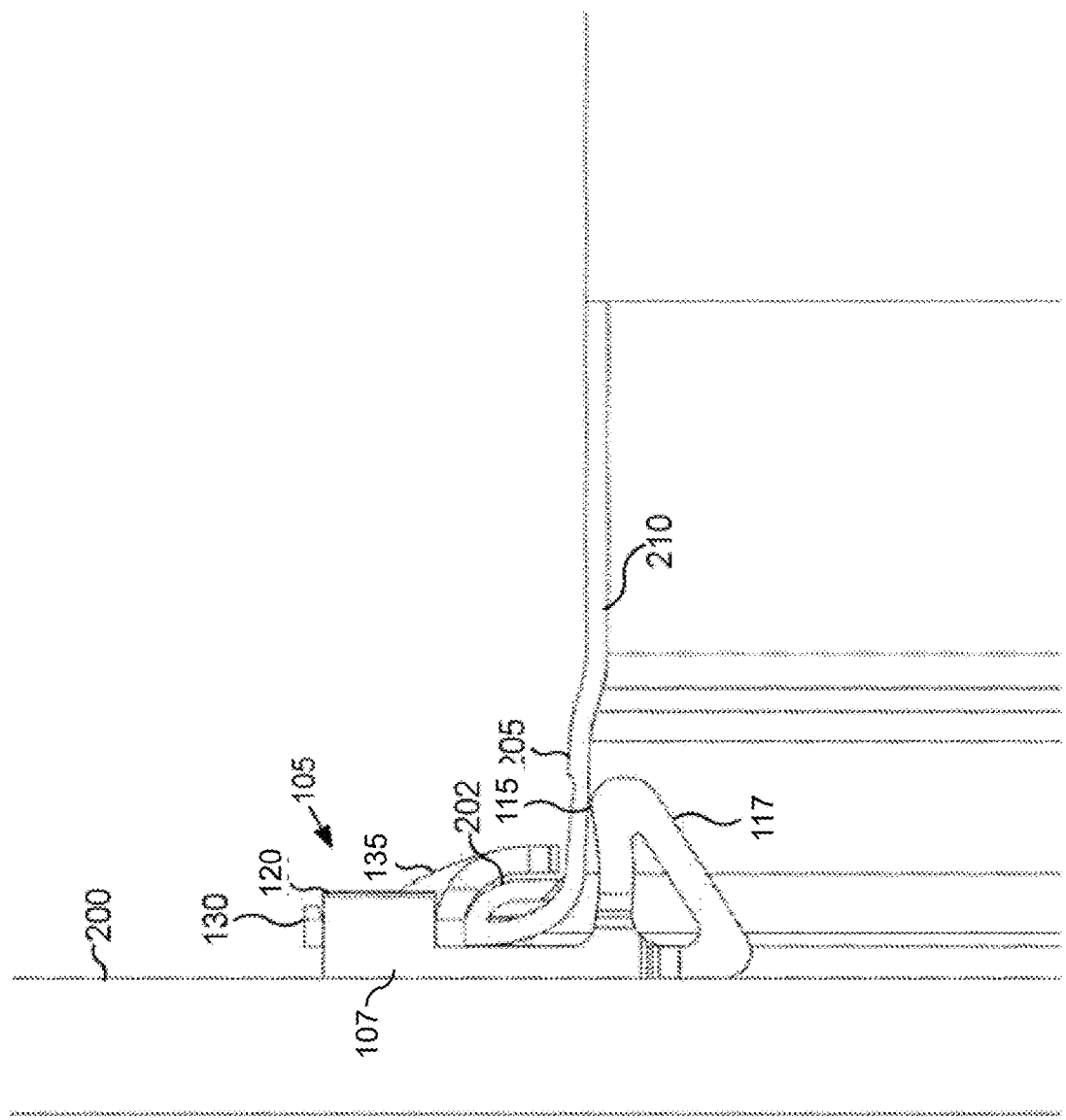
FIG. 5 is a pictorial diagram that illustrates a second embodiment of a system for displaying a wheel in a state where the wheel is engaged.

FIG. 5 is a pictorial diagram that illustrates a second embodiment of the system 100 for displaying a wheel 205 in a state where the wheel 205 is engaged. In this pictorial illustration, the mounting flange 107 is held fast against a flat surface 200. The inner surface 210 of a wheel is then dispose up on the mounting shelf 107. Then, the retainer clip 130 slides into its receptacle in order to hold a wheel bead 202 in place. Accordingly, once the wheel bead is held in place by the retainer clip 130, the wheel 205 itself is not able to slide off of the horizontal shelf 115. Vertical rigidity of the horizontal shelf 107 is maintained by the diagonal support member 117, which begins at the lower end of the mounting flange 107 and continues to the outer end of the shelf 105.

Figure 6:
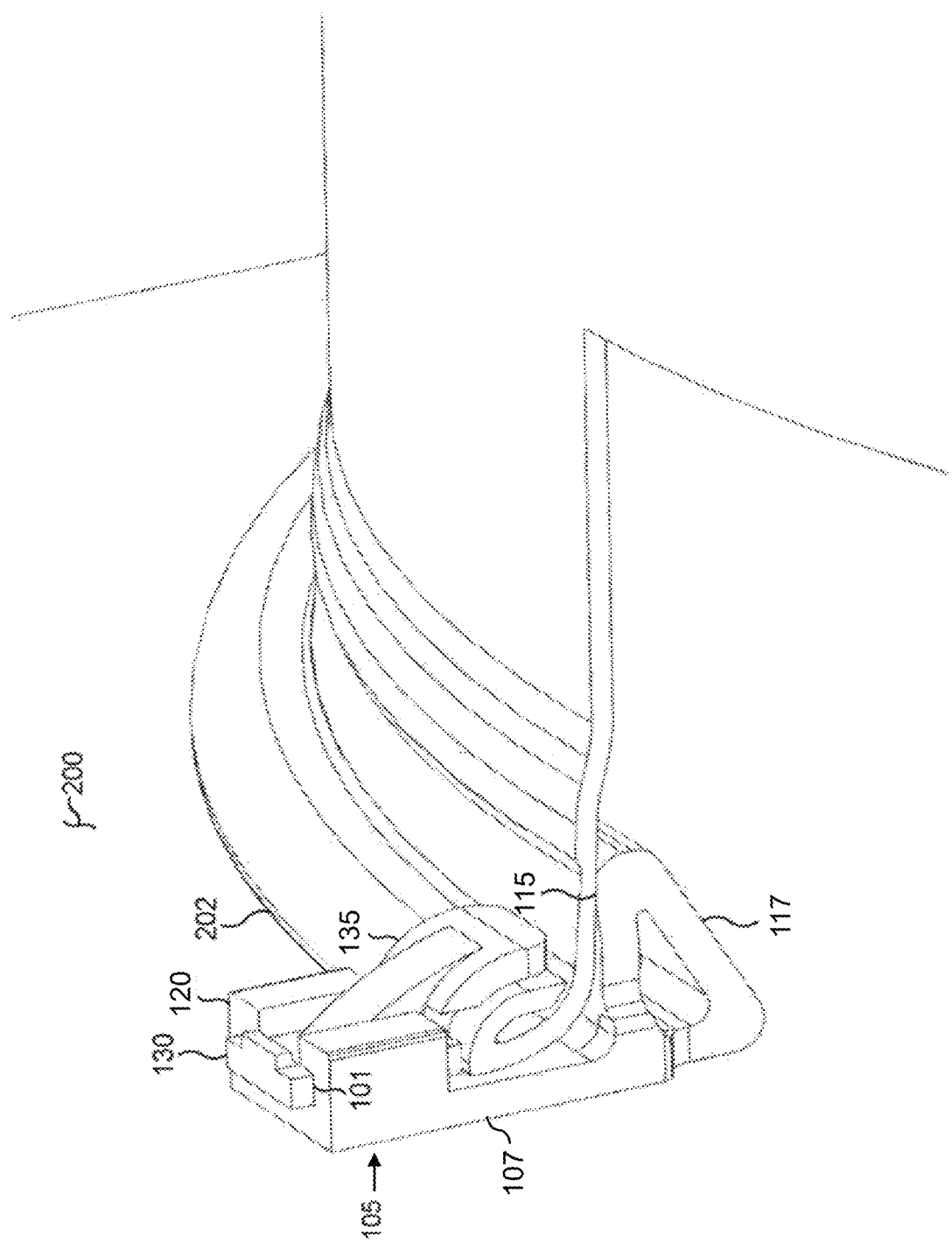
FIG. 6 is a cut-away diagram that illustrates a second embodiment of a system for displaying a wheel in a state where the wheel is engaged.

FIG. 6 is a cut-away perspective diagram that illustrates a second embodiment of a system 100 for displaying a wheel 205 in a state where the wheel 205 is engaged. As shown in this figure, the shelf unit 105, which includes a retainer channel 101, receives the retainer clip 130. Once the retainer clip 130 is in position, it prevents the bead 202 of the wheel 205 from any horizontal migration away from the shelf unit 105. Again, the horizontal shelf 115 supports the inner surface 210 of the wheel 205 and is vertically stabilized by a substantially diagonal support member 117 which emanates from the lower end of the shelf unit 105 and runs through to an end of the shelf unit 105.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

Unless specifically taught to the contrary, method steps that include the phrase " . . . comprises at least one or more of A, B, and/or C . . . " means that the method step is to include every combination and permutation of the enumerated elements such as "only A", "only B", "only C", "A and B, but not C", "B and C, but not A", "A and C, but not B", and "A and B and C". This same claim structure is also intended to be open-ended and any such combination of the enumerated elements together with a non-enumerated element, e.g. "A and D, but not B and not C", is to fall within the scope of the claim. Given the open-ended intent of this claim language, the addition of a second element, including an additional of an enumerated element such as "2 of A", is to be included in the scope of such claim. This same intended claim structure is also applicable to apparatus and system claims.

What is claimed is:

1. A system for displaying a wheel comprising:
    a shelf unit comprising:
        a mounting flange which includes one or more holes configured to receive fasteners used to mount the shelf unit to a substantially vertical surface;
        a substantially horizontal shelf mechanically attached to a lower portion of the mounting flange and protruding outward from the mounting flange;
        a stabilizer that extends from a lower end of the horizontal shelf to an outer end of the horizontal shelf;
        a retainer receiver disposed vertically along the mounting flange for receiving a retainer clip; and
    a retainer clip comprising:
        a retainer slide configured to be received by the retainer receiver; and
        a tongue mechanically attached to a lower end of the retainer slide and curved outward relative to the mounting flange.

2. The system of claim 1 wherein the tongue is configured to correspond to an outer profile of a wheel rim.

3. The system of claim 1 wherein the retainer receiver and the mounting flange collectively define an open-c channel when viewed from above.

* * * * *